P. SEYMOUR.
Cotton-Planters.
No. 144,037. Patented Oct. 28, 1873.
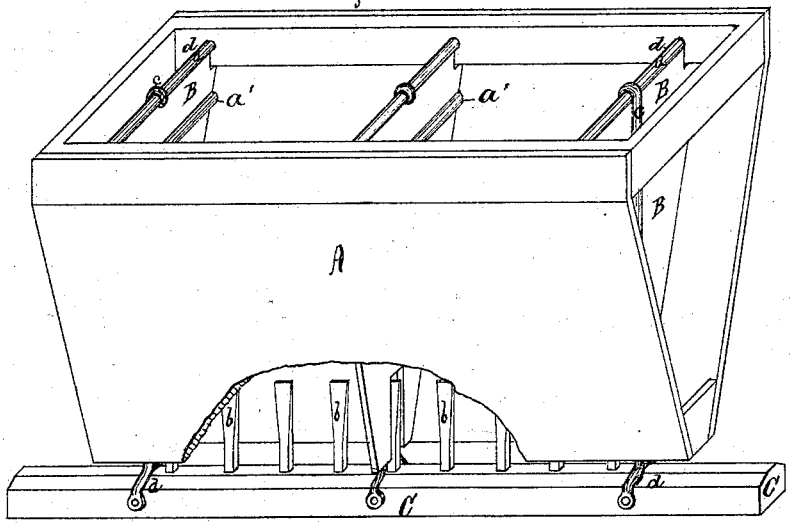
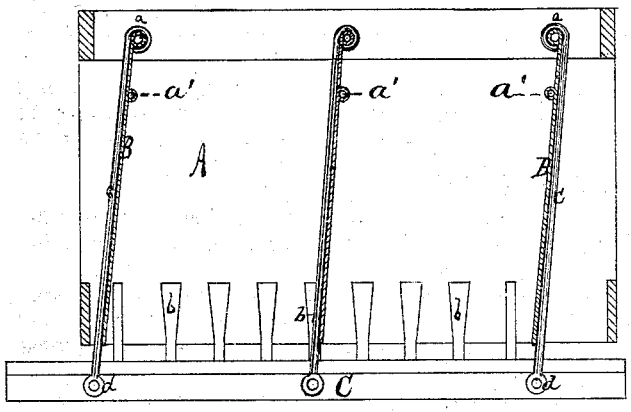
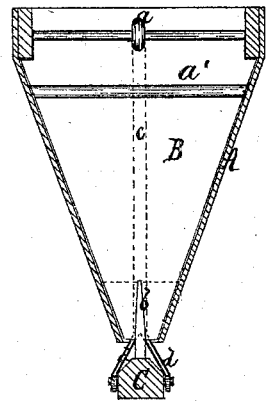

UNITED STATES PATENT OFFICE.

PIERPONT SEYMOUR, OF EAST BLOOMFIELD, NEW YORK.

IMPROVEMENT IN COTTON-PLANTERS.

Specification forming part of Letters Patent No. 144,037, dated October 28, 1873; application filed June 27, 1871.

*To all whom it may concern:*

Be it known that I, PIERPONT SEYMOUR, of East Bloomfield, in the county of Ontario and State of New York, have invented a new and useful Improvement in Seed-Planter, of which the following is a specification:

This invention relates to certain improvements in seed-planters; and consists of one or more plates pivoted upon and depending within the hopper, in combination with each other and with a stirring-rod provided with pins suspended below the seed-outlet, the construction and operation of which will be fully hereinafter described.

In the drawings, Figure 1 is a perspective view of my improved seed-planter. Fig. 2 is a longitudinal vertical section, and Fig. 3 a transverse section.

Similar letters of reference indicate like parts in the several figures.

The letter A represents the hopper, which is preferably of a quadrilateral form, and tapering toward its bottom portion, as shown. Ordinarily two of these hoppers are employed, generally being placed in the long hopper of a seed-drill, at suitable distance apart to plant the rows. B B represent the swinging plates or diaphragms. These plates are pivoted to the bars $a'$, near the top of the hopper, and extend to near the bottom of the hopper, and are free to have a swinging motion.

I prefer to use three of these swinging plates, but it is evident that in a small hopper one or two will answer. These swinging plates are very effective for shaking and stirring down cotton-seed in the hopper, as they are placed sufficiently near each other to move said seed bodily in one direction, and then in the other.

This seed, owing to its fibrous covering, is very difficult to move downward, and catches and arches in such a manner that ordinary apparatus will not effect the planting of the same.

In my machine the entire body of the seed receives an alternate vibrating action from end to end, which increases in intensity toward the bottom, as the plates at that point have a greater swinging motion.

C is a reciprocating stirrer-rod arranged at the bottom of the hopper, and is the same as is ordinarily used in grain-drills, and is provided with pins or teeth $b\ b$, which project upward into the hopper. The object of the stirring-rod and pins is to facilitate in working down the seed at the extreme lower edge of the hopper.

This stirring-rod is hung to the pendent rods C C, which have their bearings upon the upper ends of the plates B, as shown in Figs. 1 and 2. The lower ends of the rods $c\ c$ are formed with stirrups $d\ d$, which embrace the rod C and are pivoted thereto, as shown.

I am aware that a bar moving horizontally upon the top of a hopper or grain-receptacle and carrying rigidly a series of stirrers is not new, and such is not claimed; but I am not aware that a series of swinging plates hung upon rigid bars have ever been arranged to operate in connection with a hopper, as above described.

What I claim is—

The plate or plates B, pivoted at $a'$, and depending within the hopper A, in combination with each other and with the stirring-rod C and its pins $b\ b$, suspended beneath the hopper by the rods $c\ c$, the whole arranged and operating substantially as and for the purpose described.

In witness whereof I have hereunto signed my name in the presence of two subscribing witnesses.

P. SEYMOUR.

Witnesses:
  R. F. OSGOOD,
  ARCHD. BAINE.